June 5, 1956  HANS-GERHARD ZIMMERMANN  2,748,487

PLANIMETER

Filed April 25, 1952  2 Sheets-Sheet 1

INVENTOR:
HANS-GERHARD ZIMMERMAN
BY:

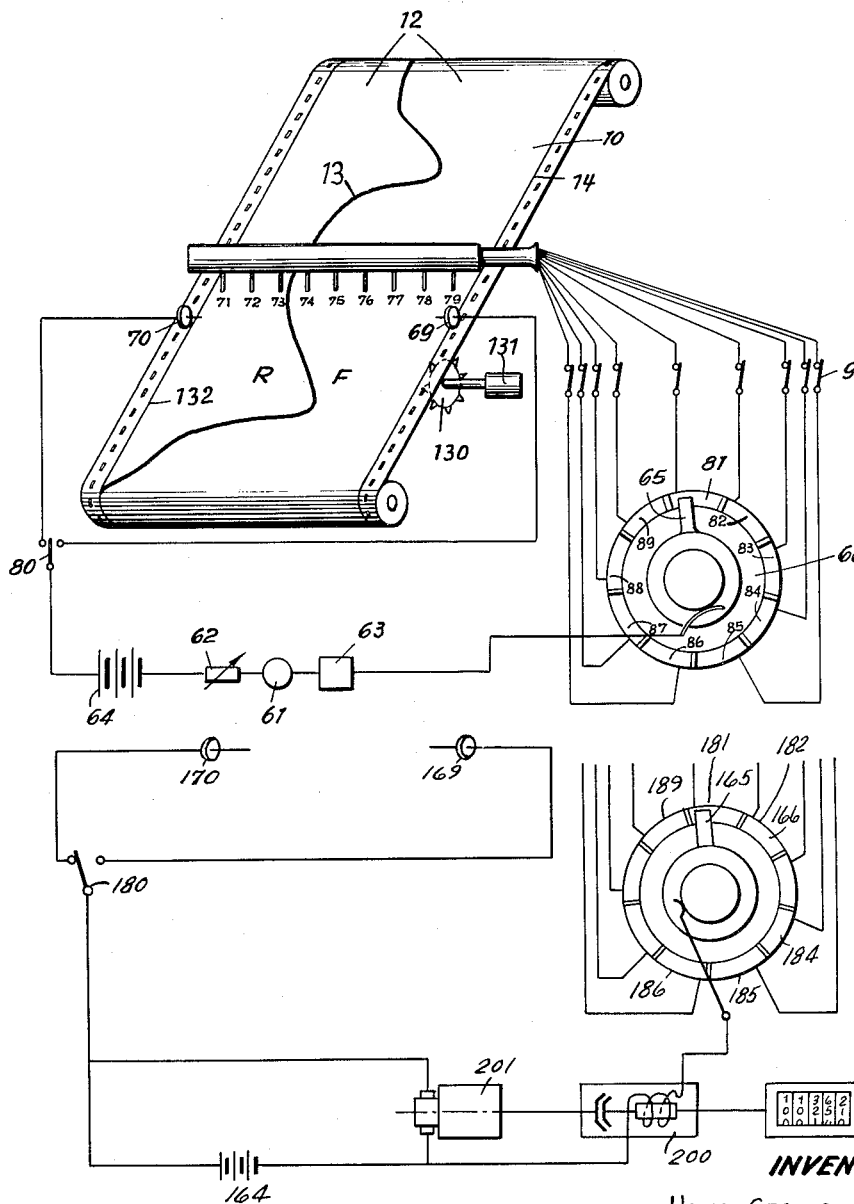

United States Patent Office 2,748,487
Patented June 5, 1956

2,748,487

PLANIMETER

Hans-Gerhard Zimmermann, Korntal, Wurttemberg, Germany, assignor to Robert Bosch G. m. b. H., Stuttgart, Germany Application April 25, 1952, Serial No. 284,473

Claims priority, application Germany April 30, 1951

13 Claims. (Cl. 33—123)

The present invention relates to a method and arrangement for determining areas by a planimetric method, and more particularly to an arrangement for summing or integrating the instantaneous values of a variable physical quantity represented by a line or a graph.

The present invention relates particularly to the evaluation of a graph formed by an insulating line formed by melting and/or burning a metal layer arranged on one side of an insulating band-shaped support, said line subdividing the metal layer into at least two parts electrically insulated from each other.

It is known in the art to produce such lines by moving the metal layer closely underneath an electrode and to produce a current by means of a voltage applied to the metal layer and the electrode so that the metal layer melts or burns away at the spot underneath the electrode, a thin insulating line being generated in this way.

If the electrode is imparted a motion at right angles to the longitudinal motion of the band-shaped support of the metal layer, the amplitude of this motion being proportional to the instantaneous value of the variable physical quantity to be recorded by the line, the line indicates the variation with time of the physical quantity.

It is an object of the present invention to evaluate the sum or integral of the instantaneous values of the physical quantity taken over the predetermined time periods.

It is another object of the present invention to determine the area of a surface limited by the line.

It is a further object of the present invention to provide a simple arrangement for determining areas and evaluating integrals which operates automatically and with great accuracy.

A method according to the present invention comprises the steps of rendering the areas to be determined electrically conductive so as to obtain electrically conductive surface portions, scanning the electrically conductive surface portions so as to obtain electrical impulses corresponding to surface elements having unit area, and counting the electrical impulses so as to obtain an indication corresponding to the total area of the surface elements having unit area.

An arrangement for determining the area of an electrically conductive surface according to the invention comprises in combination a first support carrying the electrically conductive surface, a plurality of spaced contact means, a second support carrying the plurality of spaced contact means in a position adapted to contact the electrically conductive surface, means for moving one of said supports relative to the other so that the plurality of spaced contact means traces parallel scanning lines, respectively, lying at least partly in the electrically conductive surface, electrical means connected to the electrically conductive surface and each of the spaced contact means for producing an electrical impulse whenever the scanning lines traced by any of the spaced contact means, respectively, are lying within the electrically conductive surface, and means for counting the total number of the electrical impulses, said number being an indication of the area of the electrically conductive surface.

Preferably switching means are provided which have a plurality of stationary contacts connected, respectively, to the spaced contact means, a movable contact cooperating with the stationary contacts one after another, the electrical means being connected to the electrically conductive surface and the movable contact.

An arrangement for summing the instantaneous values of a variable physical quantity according to the invention comprises in combination a band-shaped support consisting of electrically insulating material, a metal layer arranged on one side of the band-shaped support, said metal layer including at least two parts electrically insulated from each other by an insulating line representing the instantaneous values of the variable physical quantity, means for imparting a periodical motion to the band-shaped support in the longitudinal direction thereof, a plurality of spaced contacts arranged across the width of the band-shaped support in contact with the metal layer, these contacts tracing parallel scanning lines, respectively, on the metal layer during the motion of the band-shaped support, electrical means connected to one of the parts of the metal layer and to each of the spaced contacts for producing an electrical impulse whenever any one of the scanning lines traced by the spaced contacts is in the one part of the metal layer, and means for counting the total number of the electrical impulses, this number being an indication of the sum of the instantaneous values of the variable physical quantity.

Preferably the switching means include a commutator having a plurality of stationary segments insulated from one another and connected, respectively, to the spaced contacts, a movable brush sliding over the segments of the commutator one after another, the electrical means being connected to the movable brush.

In one embodiment of the present invention an electromagnetic stepping mechanism driving the counter is driven by the electrical impulses.

In one embodiment of the present invention the motion imparting means include an electromagnetic stepping mechanism being stepped one step forward after each of the spaced contacts has once been connected to the counting means.

The counting means include preferably an ammeter and in series therewith an ampere hours meter counting the amper hours of the electrical impulses.

In one embodiment of the present invention a plurality of counting devices is associated, respectively, with the spaced contacts and counts the impulses generated during the summing of predetermined instantaneous values of the physical quantity.

In another embodiment of the present invention the counting means include an electric motor rotating at constant speed, a revolution counter driven by the electric motor, and an electromagnetic coupling inserted between the electric motor and the revolution counter, the electromagnetic coupling being responsive to the electric impulses.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 3 shows diagrammatically a modified embodiment of the present invention and Fig. 4 shows a modification of the counting mechanism.

Figure 1:
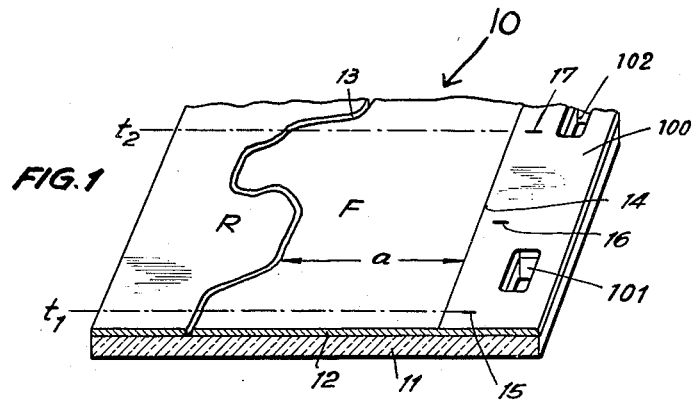
Fig. 1 is a perspective view on an exaggerated scale of part of the support of the metal layer and the line representing the variable physical quantity.

Referring now to the drawings and first to Figure 1, a carrier 10 consists of a band-shaped support 11 consisting of insulating material and having a thickness of about 30 microns, and of a metal layer 12 vaporized upon the band-shaped support 11 over the entire width thereof. The metal layer consists preferably of a low melting alloy of zinc and cadmium and has a thickness of 0.1 micron. The metal layer is subdivided into two parts F and R by a line 13 produced by melting or burning the metal layer in a manner described more in detail hereinabove. The line 13 represents for instance the time graph of the current consumption of a plant.

The instantaneous values of the current measured in amperes which exceed a predetermined fixed value represented by a reference line 14, are given by the distances $a$ of the line 13 from the reference line 14. The part 100 between the reference line 14 and the edge of the part F of the metal layer 12 is provided with marks such as 15, 16 and 17 having equal distances from one another and indicating the time. These marks 15, 16, 17 can also be produced by melting or burning. Furthermore, perforations such as 101 and 102 are provided in the support 11 and the part 100 of the metal layer 12, these perforations serving for the transport of the support 11 as more fully described hereinafter.

The area of the surface F limited by the line 13, the time ordinates $t_1$ and $t_2$, and the reference line 14 indicates the peak consumption in ampere hours, the line voltage being assumed to be constant during the production of the line 13. The other part R of the metal layer 12 is the remaining area and can be evaluated as described more in detail hereinafter in connection with Figure 3.

Figure 2:
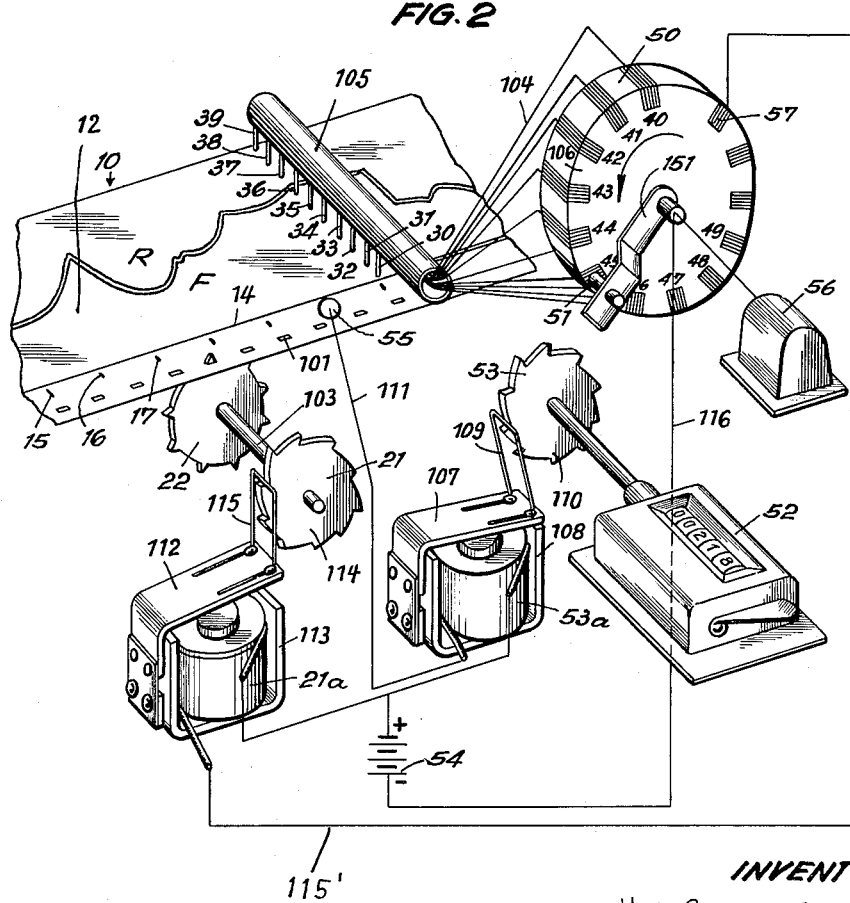
Fig. 2 is a perspective view for a first embodiment of the present invention.

Referring now to Figure 2 showing the device for evaluating the area of the part F of the metal layer 12, the carrier 10 of the diagram is placed in a measuring device more fully to be described in detail presently.

A transport device including a stepping mechanism 21 termed hereinafter the second stepping mechanism, and a transporting wheel 22 being arranged on the shaft 103 of the stepping mechanism 21 and engaging the perforations 101, moves the carrier 10 forward step by step. Above the carrier 10 and across the same are arranged a plurality of, for instance ten, contacts 30 to 39, spaced apart by equal distances corresponding to units of the predetermined scale of the representation of the physical quantity by the line 13. The contacts 30 to 39 are so arranged that they slide easily over the metal layer 12.

The contacts 30 to 39 are connected, respectively, with the segments 40 to 49 of a stationary commutator 50. The connections such as 104 between the contacts and segments pass through a preferably insulating tube 105 arranged above and across the metal layer 12, the contacts 30 to 39 protruding downward from the tube 105. A brush 51 attached to the rotating switch arm 151 of the commutator 50 slides over the segments 40, etc. and makes contact with each segment after the brush 51 has left the preceding one. To this end the segments are separated from each other by spacings such as 106 consisting of insulating material and being thicker than the diameter of the brush 51. The switch arm 151 is driven by an electric motor 56 causing the switch arm 151 to rotate in the direction of the arrow.

A revolution counter 52 is driven by a first stepping wheel 53 forming part of a stepping mechanism (termed hereinafter the first stepping mechanism) and driven by the armature 107 of a first electromagnet 108 having a winding 53a. The armature 107 is shown in the operating position in which it is attracted by the electromagnet 108. The armature 107 is connected by a stirrup-like member 109 to one of the ten teeth 110 of the first stepping wheel 53 and is returned by resilient means (not shown) or the like into the inoperative position in which it is not attracted by the electromagnet and ready for switching the stepping wheel 53 one step forward. The stepping mechanism takes some time in order to return from the operative position into the inoperative position. The winding 53a is connected with the positive terminal of a battery 54 the negative terminal of which is connected by a connection 116 to the switch arm 151. The other end of the winding 53a is connected by a connection 111 to a contact roller 55 which slides along the reference line 14 of the part F of the metal layer 12.

The second stepping mechanism 21 is driven by the armature 112 of a second electromagnet 113 engaging the teeth 114 of the second stepping mechanism by a stirrup-like member 115. The second electromagnet 113 has a winding 21a which is connected to the positive terminal of the battery 54 and by a connection 115′ to a segment 57 of the commutator 50 which is separated from the last segment 49 connected to the contacts by a distance exceeding the equal distances between the segments 40 to 49. It should be noted that the electromagnets 108 and 113 cannot simultaneously attract their armatures since the brush 51 is not at the same time in contact with one of the segments 40 to 49 and thus completes the circuit for the first electromagnet, and in contact with the segment 57 completing the circuit for the second electromagnet 113.

The operation of this device is as follows:

In the position of the device shown in Figure 2 the brush 51 has reached the segment 45 connected to the contact 35 tracing on the metal layer 12 a scanning line parallel to the edge thereof, said scanning line being situated in the position shown in the drawing inside the part F the area of which is to be determined. In consequence thereof the circuit of the electromagnet 108 is closed, the circuit extending from the positive terminal of battery 54 over winding 53a of the electromagnet 108, conductor 111, contact roller 55, part F of the metal layer 12, contact 35, segment 45 connected therewith, brush 51, switch arm 151, and conductor 116, to the negative terminal of battery 54. In consequence thereof, the electromagnet 108 is energized and attracts the armature 107 thereof which is shown in attracted position. By means of a stirrup 109 the armature has switched the stepping wheel 53 one step forward and rotated the shaft thereof through one tenth of a revolution. In consequence thereof, the current impulse flowing through the winding 53a is counted by the revolution counter 52. If now the switch arm 151 moves further so that the brush 51 makes contact with the segment 46, another current impulse is produced in the circuit of winding 53a since the contact 36 traces a scanning line which is also within part F of the metal layer 12. However, the next contact 37 traces a scanning line falling within the part R of the metal layer 12, and in consequence thereof no impulse is produced in the winding 53a.

The same holds true if the brush 51 is in contact with the segments 48 and 49 connected, respectively, to the contacts 38 and 39 because the scanning lines traced by these contacts are in the part R of the metal layer 12. Thus, it will be understood that the counter 52 is not moved when the brush 51 is in contact with segments, such as 47 to 49, being connected, respectively, to contacts 37 to 39 tracing scanning lines being in part R of the metal layer 12.

When the brush 51 comes into contact with the segment 57 arranged at a larger angular distance from the segment 49 than the angular distance between any consecutive two of the segments 40 to 49, the circuit for the winding 21a of the second electromagnet 113 is closed so that the second stepping mechanism 21, 22 is moved one step forward so that the support 10 is also moved one step forward.

After this the brush 51 makes contact once more with the segments 40 to 49 and impulses energizing the first electromagnet 108 are generated whenever the brush 51 makes contact with a segment connected to a contact being now in contact with the part F of the metal layer 12, the width of the part F varying in correspondence with the ordinates defined by the line 13. The number of the current impulses registered by the counter 52 is an indication of the number of surface elements of unit area contained in the part F of the metal layer 12 and limited by two ordinates such as $t_1$, $t_2$ shown in Figure 1. Each of the surface elements of unit area represents an energy unit the magnitude of which depends on the one hand on the scale and the speed of transport used in tracing the line 13, and on the other hand on the speed of transport used in scanning the part F and on the distance of the contacts 30 to 39. In this way an apparatus constant is obtained by which the number of the counted impulses is to multiplied, and this constant can be made an integer by suitably choosing the transport step.

The accuracy of this device can be increased by using an as large as possible number of scanning contacts and a commutator having a correspondingly large number of segments. Furthermore, the accuracy of the measurements of the area can be increased by making the single steps of the transporting stepping mechanism as small as possible.

If in addition to the sum or integral of the instantaneous values of the physical quantity the frequency of individual instantaneous values having a predetermined magnitude is to be determined, for instance in order to ascertain deviations from a rated value, additional counting devices are inserted between the scanning contacts and the segments connected therewith.

The winding 53$a$ of the stepping mechanism connected to the counter 52 can be replaced by the winding of an electromagnetic coupling, said winding being controlled by the commutator circuit, the commutator having segments arranged closely to one another as will be described with reference to Figs. 3 and 4 hereinafter.

Referring now to Figure 3 showing a modified embodiment, the carrier 10 is moved forward by means of a transporting wheel 130 driven by an electric motor 131 at constant speed. Furthermore, the segments 81 to 89 of the commutator 66 are relatively broad and connected, respectively, to the contacts 71 to 79 by means of switches such as 91 by which individual segments can be disconnected from the respective contacts so that only instantaneous values are counted which lie between predetermined limits.

Furthermore, the rotating switch arm 65 which is driven from motor 131 of the commutator 66 is connected over an ampere hour meter 63, an ammeter 61, an adjustable resistor 62, a battery 64, and a double throw switch 80 in one position thereof, to a contact roller 69 being in contact with the part F of the metal layer 12 along the reference line 14 thereof. In consequence thereof, a constant current depending on the voltage of the battery 64 and the total resistance of the described circuit flows in the same when the switch arm 65 is in contact with segments connected to contacts tracing the scanning lines being inside the part F of the metal layer 12. If the switch arm 65 rotates at a sufficiently high speed mean values are indicated by the ammeter 61 and the ampere hours meter 63, respectively, owing to the inertia of these instruments, the magnitude of the mean values being proportional to the number of contacts being in contact with the part F of the metal layer 12. This arrangement involves the advantage that by means of the ammeter 61 calibrated in suitable units the magnitude of the instantaneous values recorded by the line 13 can be ascertained at any moment and the device be calibrated according to the reading of the ammeter 61.

In order to sum or integrate the instantaneous values by means of the device shown in Figure 3, the speed of transport of the carrier 10 has to be kept constant during the evaluation. The accuracy increases with the number of the scanning contacts and with decreasing transport speed of the carrier 10 and also with increasing angular speed of the switch arm 65.

The double throw switch 80 is provided for evaluating, if desired, also the part R of the metal layer 12. To this end, a second contact roller 70 is in contact with the reference line 132 near the other edge of the carrier 10 and connected to the double throw switch 80 in the other position thereof. In consequence thereof either the part F or the part R can be evaluated by bringing the double throw switch 80 into one or the other positions thereof, the switch being shown in Figure 3 in a middle position disconnecting both contact rollers 63 and 70 from the electric circuit.

It should be noted that the embodiment shown in Figure 2 could also be provided, if desired, with a double throw switch and a contact roller being in contact with the part R of the metal layer 12, such as shown in Figure 3.

In the modified arrangement shown in Fig. 4, a counting mechanism 152 is controlled by the commutator circuit. As long as the rotary brush arm 165 of the commutator 166 sweeps over the segments 181 to 189 connected to the contacts scanning the area to be determined, the electromagnetic coupling 200 remains in coupling position and transfers the rotary motion of an electric motor 201, which rotates at constant speed, to the revolution counter 152. The winding of the electromagnetic coupling 200 is connected to the rotating brush arm 165 and to the battery 164, the circuit being completed through to the double-throw switch 180, the contact rollers 169 and 170 and the scanning contacts corresponding to the arrangement shown in Fig. 3.

As soon as the brush 165 leaves the last commutator segment connected to a contact tracing a scanning line within the area to be determined, the circuit of the winding of the electromagnetic coupling 200 is interrupted so that the coupling 200 is released and the revolution counter 152 stops. Then the support of the area is moved one step forward and the area is scanned in this position of the support by the scanning contacts so that when the brush 165 is in contact with the first segment connected to a scanning contact under voltage, the electromagnetic coupling 200 is again energized. The rotating brush arm 165 completes an entire revolution between two consecutive steps of the support whereas the revolution counter 152 is rotated through an angle which is proportional to the number of scanning contacts located inside the area to be determined. Preferably, the electric motor 201, which drives the revolution counter 152, is also used for driving the brush arm 165 since the results of the measurements are not affected by speed variations of the motor if the same motor is used for driving the switch arm and the revolution counter.

It will be understood that each of the elements described above, or two or more together, may also find a useful application in other types of methods and arrangements for determining areas differing from the types described above.

While I have illustrated and described the invention as embodied in an arrangement for summing the instantaneous values of a variable physical quantity, I do not intend to be limited to the details shown, since various modifications and structural changes may be made without departing in any way from the spirit of my invention.

What I claim as new and desire to secure by Letters Patent is:

1. An arrangement for summing the instantaneous values of a variable physical quantity, comprising in combination, a band-shaped support consisting of electrically insulating material; a metal layer arranged on one side of said band-shaped support, said metal layer including at least two parts electrically insulated from each other by an insulating line which is a curve corresponding to the instantaneous values of said variable physical quantity; means for imparting motion to said band-shaped support in the longitudinal direction thereof; a reference contact engaging one part of said two parts of said layer and tracing a reference line along the same during movement of said band-shaped support; a transverse row of spaced contacts arranged across said band-shaped support in contact with said metal layer so that the number of contacts engaging said one part of said layer and being located in any moved position of said band-shaped support between said reference line and the point of said insulating line located opposite said row of contacts during movement of said band-shaped support is a measure of the instantaneous value represented by the respective point of said insulating line; electrical means connected to said reference contact and to each of said spaced contacts for producing an electrical current whenever any one of said scanning lines traced by said spaced contacts is in said one part of said metal layer; and means for registering the sum of said electrical currents, said sum being an indication of the sum of the instantaneous values of said variable physical quantity.

2. An arrangement for summing the instantaneous values of a variable physical quantity, comprising in combination, a band-shaped support consisting of electrically insulating material; a metal layer arranged on one side of said band-shaped support, said metal layer including at least two parts electrically insulated from each other by an insulating line which is a curve corresponding to the instantaneous values of said variable physical quantity; means for imparting motion to said band-shaped support in the longitudinal direction thereof; a reference contact engaging one part of said two parts of said layer and tracing a reference line along the same during movement of said band-shaped support; a transverse row of spaced contacts arranged across said band-shaped support in contact with said metal layer so that the number of contacts engaging said one part of said layer and being located in any moved position of said band-shaped support between said reference line and the point of said insulating line located opposite said row of contacts during movement of said band-shaped support is a measure of the instantaneous value represented by the respective point of said insulating line; switching means having a plurality of stationary contacts connected, respectively, to said spaced contacts, and a movable contact cooperating with said stationary contacts one after another; electrical means connected to said reference contact and to said movable contact for producing an electrical current whenever any one of said scanning lines traced by said spaced contacts is in said one part of said metal layer; and means for registering the sum of said electrical currents, said sum being an indication of the sum of the instantaneous values of said variable physical quantity.

3. An arrangement for summing the instantaneous values of a variable physical quantity, comprising in combination, a band-shaped support consisting of electrically insulating material; a metal layer arranged on one side of said band-shape support, said metal layer including at least two parts electrically insulated from each other by an insulating line which is a curve corresponding to the instantaneous values of said variable physical quantity; means for imparting motion to said band-shaped support in the longitudinal direction thereof; a reference contact engaging one part of said two parts of said layer and tracing a reference line along the same during movement of said band-shaped support; a transverse row of spaced contacts arranged across said band-shaped support in contact with said metal layer so that the number of contacts engaging said one part of said layer and being located in any moved position of said band-shaped support between said reference line and the point of said insulating line located opposite said row of contacts during movement of said band-shaped support is a measure of the instantaneous value represented by the respective point of said insulating line, said spaced contacts being arranged at equal distances from one another corresponding to units of a predetermined scale; electrical means connected to said reference contact and to each of said spaced contacts for producing an electrical current whenever any one of said scanning lines traced by said spaced contacts is in said one part of said metal layer; and means for registering the sum of said electrical currents, said sum being an indication of the sum of the instantaneous values of said variable physical quantity.

4. An arrangement for summing the instantaneous values of a variable physical quantity, comprising in combination, a band-shaped support consisting of electrically insulating material; a metal layer arranged on one side of said band-shaped support, said metal layer including at least two parts electrically insulated from each other by an insulating line which is a curve corresponding to the instantaneous values of said variable physical quantity; means for imparting a periodical motion to said band-shaped support in the longitudinal direction thereof; a reference contact engaging one part of said two parts of said layer and tracing a reference line along the same during movement of said band-shaped support; a transverse row of spaced contacts arranged across said band-shaped support in contact with said metal layer so that the number of contacts engaging said one part of said layer and being located in any moved position of said band-shaped support between said reference line and the point of said insulating line located opposite said row of contacts during movement of said band-shaped support is a measure of the instantanous value represented by the respective point of said insulating line; a commutator having a plurality of stationary segments insulated from one another and connected, respectively, to said spaced contacts; a movable brush sliding over said segments of said commutator one after another; electrical means connected to said reference contact and to said movable brush for producing an electrical impulse whenever any one of said scanning lines traced by said spaced contacts is in said one part of said metal layer; an electromagnetic stepping mechanism driven by said electrical impulses; and a counter driven by said electromagnetic stepping mechanism and counting the total number of said electrical impulses, said number being an indication of the sum of the instantaneous values of said variable physical quantity.

5. An arrangement for summing the instantaneous values of a variable physical quantity, comprising in combination, a band-shaped support consisting of electrically insulating material; a metal layer arranged on one side of said band-shaped support, said metal layer including at least two parts electrically insulated from each other by an insulating line which is a curve corresponding to the instantaneous values of said variable physical quantity; means for imparting a periodical motion to said band-shaped support in the longitudinal direction thereof, said motion imparting means including an electromagnetic stepping mechanism; a reference contact engaging one part of said two parts of said layer and tracing a reference line along the same during movement of said band-shaped support; a transverse row of spaced contacts arranged across said band-shaped support in contact with said metal layer so that the number of contacts engaging said one part of said layer and being located in any moved position of said band-shaped support between said reference line and the point of said insulating line located opposite said row of contacts during movement of said band-shaped support is a measure of the instantaneous value represented by the respective point of said insulating line; electrical means connected to said reference contact and to each of said spaced contacts for producing an electrical impulse whenever any one of said scanning lines traced by said spaced contacts is in said one part of said metal layer; and means for counting the total number of said electrical impulses, said number being an indication of the sum of the instantaneous values of said variable physical quantity.

6. An arrangement for summing the instantaneous values of a variable physical quantity, comprising in combination, a band-shaped support consisting of electrically insulating material; a metal layer arranged on one side of said band-shaped support, said metal layer including at least two parts electrically insulated from each other by an insulating line which is a curve corresponding to the instantaneous values of said variable physical quantity; motion imparting means for imparting a periodical motion to said band-shaped support in the longitudinal direction thereof; a reference contact engaging one part of said two parts of said layer and tracing a reference line along the same during movement of said band-shaped support; a transverse row of spaced contacts arranged across said band-shaped support in contact with said metal layer so that the number of contacts engaging said one part of said layer and being located in any moved position of said band-shaped support between said reference line and the point of said insulating line located opposite said row of contacts during movement of said band-shaped support is a measure of the instantaneous value represented by the respective point of said insulating line; a commutator having a plurality of segments insulated from one another, part of said segments being connected, respectively, to said spaced contacts, and at least one of said segments being unconnected with said spaced contacts; a movable brush sliding over said segments of said commutator one after another; electrical means connected to said reference contact and to said movable brush for producing an electrical impulse whenever said brush slides over any of said segments of said commutator, said impulses produced by said movable brush sliding over any of said segments connected, respectively, to said spaced contacts being generated whenever any of said scanning lines traced, respectively, by said spaced contacts is in said one part of said metal layer; a first electromagnetic stepping mechanism driven by said electrical impulses generated whenever any of said scanning lines traced, respectively, by spaced contacts is in said one part of said metal layer; a second electromagnetic stepping mechanism actuating said motion imparting means and being driven by said electrical impulse produced by said movable brush sliding over said one of said segments which is unconnected with said spaced contacts; and a counter driven by said first electromagnetic stepping mechanism and counting the total number of said electrical impulses, said number being an indication of the sum of the instantaneous values of said variable physical quantity.

7. An arrangement for summing the instantaneous values of a variable physical quantity, comprising in combination, a band-shaped support consisting of electrically insulating material; a metal layer arranged on one side of said band-shaped support, said metal layer including at least two parts electrically insulated from each other by an insulating line which is a curve corresponding to the instantaneous values of said variable physical quantity; means for imparting a continuous motion to said band-shaped support in the longitudinal direction thereof; a reference contact engaging one part of said two parts of said layer and tracing a reference line along the same during movement of said band-shaped support; a transverse row of spaced contacts arranged across said band-shaped support in contact with said metal layer so that the number of contacts engaging said one part of said layer and being located in any moved position of said band-shaped support between said reference line and the point of said insulating line located opposite said row of contacts during movement of said band-shaped support is a measure of the instantaneous value represented by the respective point of said insulating line; electrical means connected to said reference contact and to each of said spaced contacts for producing an electrical current whenever any one of said scanning lines traced by said spaced contacts is in said one part of said metal layer; and means for registering the sum of said electrical currents, said sum being an indication of the sum of the instantaneous values of said variable physical quantity, said registering means including an ampere hours meter counting the ampere hours of said electrical currents.

8. An arrangement for summing the instantaneous values of a variable physical quantity, comprising in combination, a band-shaped support consisting of electrically insulating material; a metal layer arranged on one side of said band-shaped support, said metal layer including at least two parts electrically insulated from each other by an insulating line which is a curve corresponding to the instantaneous values of said variable physical quantity; means for imparting continuous motion to said band-shaped support in the longitudinal direction thereof; a reference contact engaging one part of said two parts of said layer and tracing a reference line along the same during movement of said band-shaped support; a transverse row of spaced contacts arranged across said band-shaped support in contact with said metal layer so that the number of contacts engaging said one part of said layer and being located in any moved position of said band-shaped support between said reference line and the point of said insulating line located opposite said row of contacts during movement of said band-shaped support is a measure of the instantaneous value represented by the respective point of said insulating line; electrical means connected to said reference contact and to each of said spaced contacts for producing an electrical current whenever any one of said scanning lines traced by said spaced contacts is in said one part of said metal layer; means for registering the sum of said electrical currents, said sum being an indication of the sum of the instantaneous values of said variable physical quantity, said registering means including an ampere hours meter counting the ampere hours of said electrical currents; and an ammeter in series with said ampere hours meter for measuring instantaneous current values.

9. An arrangement for summing the instantaneous values of a variable physical quantity, comprising in combination, a band-shaped support consisting of electrically insulating material; a metal layer arranged on one side of said band-shaped support, said metal layer including at least two parts electrically insulated from each other by an insulating line which is a curve corresponding to the instantaneous values of said variable physical quantity; means for imparting a periodical motion to said band-shaped support in the longitudinal direction thereof, said motion imparting means including an electro-magnetic stepping mechanism; a reference contact engaging one part of said two parts of said layer and tracing a reference line along the same during movement of said band-shaped support; a transverse row of spaced contacts arranged across said band-shaped support in contact with said metal layer so that the number of contacts engaging said one part of said layer and being located in any moved position of said band-shaped support between said reference line and the point of said insulating line located opposite said row of contacts during movement of said band-shaped support is a measure of the instantaneous value represented by the respective point of said insulating line; electrical means connected to said reference contact and to each of said spaced contacts for producing an electrical impulse whenever any one of said scanning lines traced by said spaced contacts is in said one part of said metal layer; and means for counting the total number of said electrical impulses, said number being an indication of the sum of the instantaneous values of said variable physical quantity, said electro-magnetic stepping mechanism being stepped one step forward after each of said spaced contacts has once been connected to said counting means.

10. An arrangement for summing the instantaneous values of a variable physical quantity, comprising in combination, a band-shaped support consisting of electrically insulating material; a metal layer arranged on one side of said band-shaped support, said metal layer including at least two parts electrically insulated from each other by an insulating line which is a curve corresponding to the instantaneous values of said variable physical quantity; means for imparting a periodical motion to said band-shaped support in the longitudinal direction thereof; a reference contact engaging one part of said two parts of said layer and tracing a reference line along the same during movement of said band-shaped support; a transverse row of spaced contacts arranged across said band-shaped support in contact with said metal layer so that the number of contacts engaging said one part of said layer and being located in any moved position of said band-shaped support between said reference line and the point of said insulating line located opposite said row of contacts during movement of said band-shaped support is a measure of the instantaneous value represented by the respective point of said insulating line; electrical means connected to said reference contact and to each of said spaced contacts for producing an electrical impulse whenever any one of said scanning lines traced by said spaced contacts is in said one part of said metal layer; and means for counting the total number of said electrical impulses, said number being an indication of the sum of the instantaneous values of said variable physical quantity, said counting means including an electric motor rotating at constant speed, a revolution counter driven by said electric motor, and an electromagnetic coupling inserted between said electric motor and said revolution counter, said electromagnetic coupling being responsive to said electric impulses and being disengaged when said impulses pass through contacts which are located in the other part of said metal layer.

11. A method for summing the instantaneous values of a variable physical quantity, comprising in combination, the steps of moving in one direction an electrically conductive band-shaped area provided with an insulating line extending in said direction and defining in said conductive area two elongated electrically conductive surface portions which are insulated from each other by said insulating line, said insulating line being a curve whose longitudinal extension corresponds to time and whose transverse variations with respect to one of said surface portions correspond to the instantaneous values of a physical quantity; scanning along transverse unit areas said band-shaped area parallel to the longitudinal extension of said insulating line by electrical impulses whose number corresponds to transverse unit areas of said surface portions; and summing the impulses in said one surface portion so as to obtain the sum of said instantaneous values during a time period corresponding to the longitudinal extension of the scanned area.

12. A method for summing the instantaneous values of a variable physical quantity, comprising, in combination, the steps of moving in one direction an electrically conductive band-shaped area provided with an insulating line extending in said direction and defining in said conductive area two elongated electrically conductive surface portions which are insulated from each other by said insulating line, said insulating curve being a curve whose longitudinal extension corresponds to time and whose transverse variations with respect to one of said surface portions correspond to the instantaneous values of a physical quantity; scanning along transverse unit areas said band-shaped area parallel to the longitudinal extension of said insulating line by sending through said surface portions electrical impulses whose number corresponds to transverse unit areas of said surface portions, said insulating line blocking electrical impulses applied to the other of said surface portions; and summing the electrical impulses passing through said one surface portion so as to obtain the sum of said instantaneous values during a time period corresponding to the longitudinal extension of the scanned area.

13. An arrangement for summing the instantaneous values of a variable physical quantity, comprising in combination, a band-shaped support consisting of electrically insulating material; a metal layer arranged on one side of said band-shaped support, said metal layer including at least two parts electrically insulated from each other by an insulating line which is a curve corresponding to the instantaneous values of said variable physical quantity; electric motor means for imparting a continuous motion to said band-shaped support in the longitudinal direction thereof; a reference contact engaging one part of said two parts of said layer and tracing a reference line along the same during movement of said band-shaped support; a transverse row of spaced contacts arranged across said band-shaped support in contact with said metal layer so that the number of contacts engaging said one part of said layer and being located in any moved position of said band-shaped support between said reference line and the point of said insulating line located opposite said row of contacts during movement of said band-shaped support is a measure of the instantaneous value represented by the respective point of said insulating line; a commutator having a plurality of stationary segments insulated from one another and connected, respectively, to said spaced contacts; a movable brush sliding over said segments of said commutator; electrical means connected at least to said reference contact and to said movable brush for producing an electric current whenever any one of said scanning lines is in said one part of said metal layer, said electrical means including a source of current and means electrically connecting said source of current with said one part of said metal layer; and registering means for registering the sum of said electrical currents, said sum being an indication of the sum of the instantaneous values of said variable physical quantity, said registering means including an ampere hours meter counting the ampere hours of said electrical currents and arranged in series with said source of current and said brush; and ammeter in series with said ampere hours meter for measuring instantaneous current values.

References Cited in the file of this patent

UNITED STATES PATENTS

| | | |
|---|---|---|
| 741,881 | Bright | Oct. 20, 1903 |
| 818,601 | Beals | Apr. 24, 1906 |
| 2,199,769 | Wooley | May 7, 1940 |
| 2,354,767 | Nokes | Aug. 1, 1944 |
| 2,617,197 | Derby | Nov. 11, 1952 |

FOREIGN PATENTS

| | | |
|---|---|---|
| 329,753 | Italy | Sept. 20, 1935 |